Patented June 24, 1947

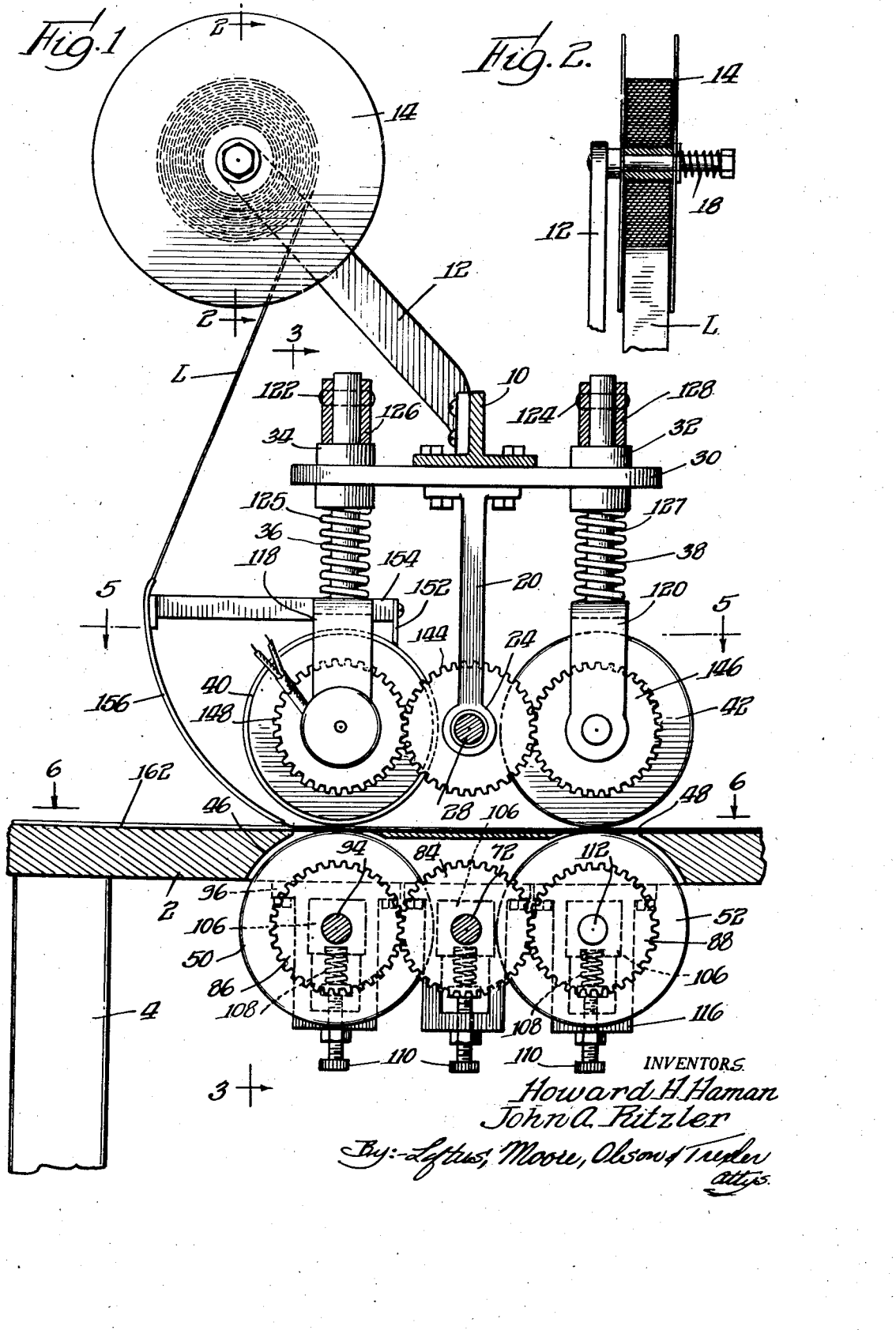

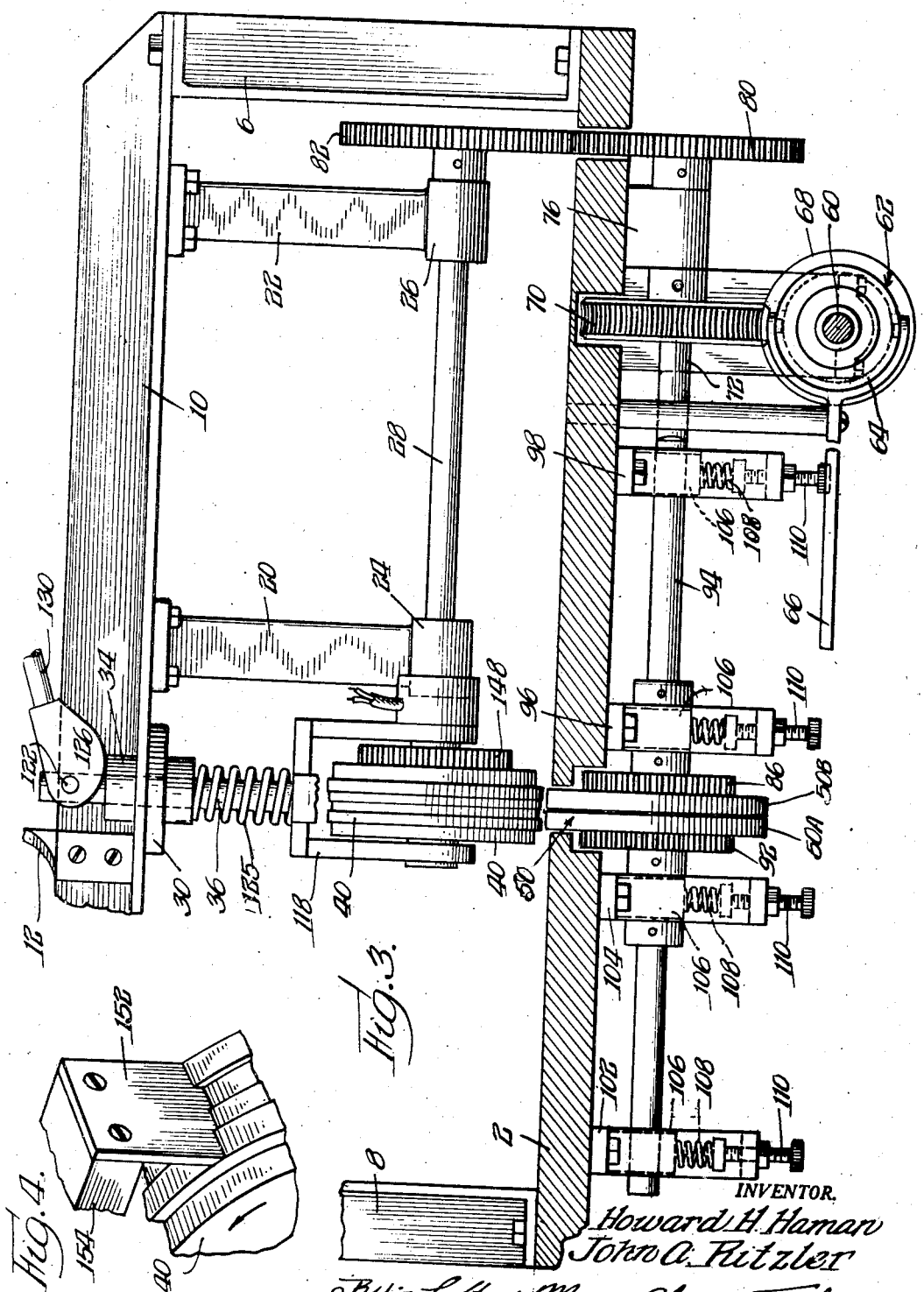

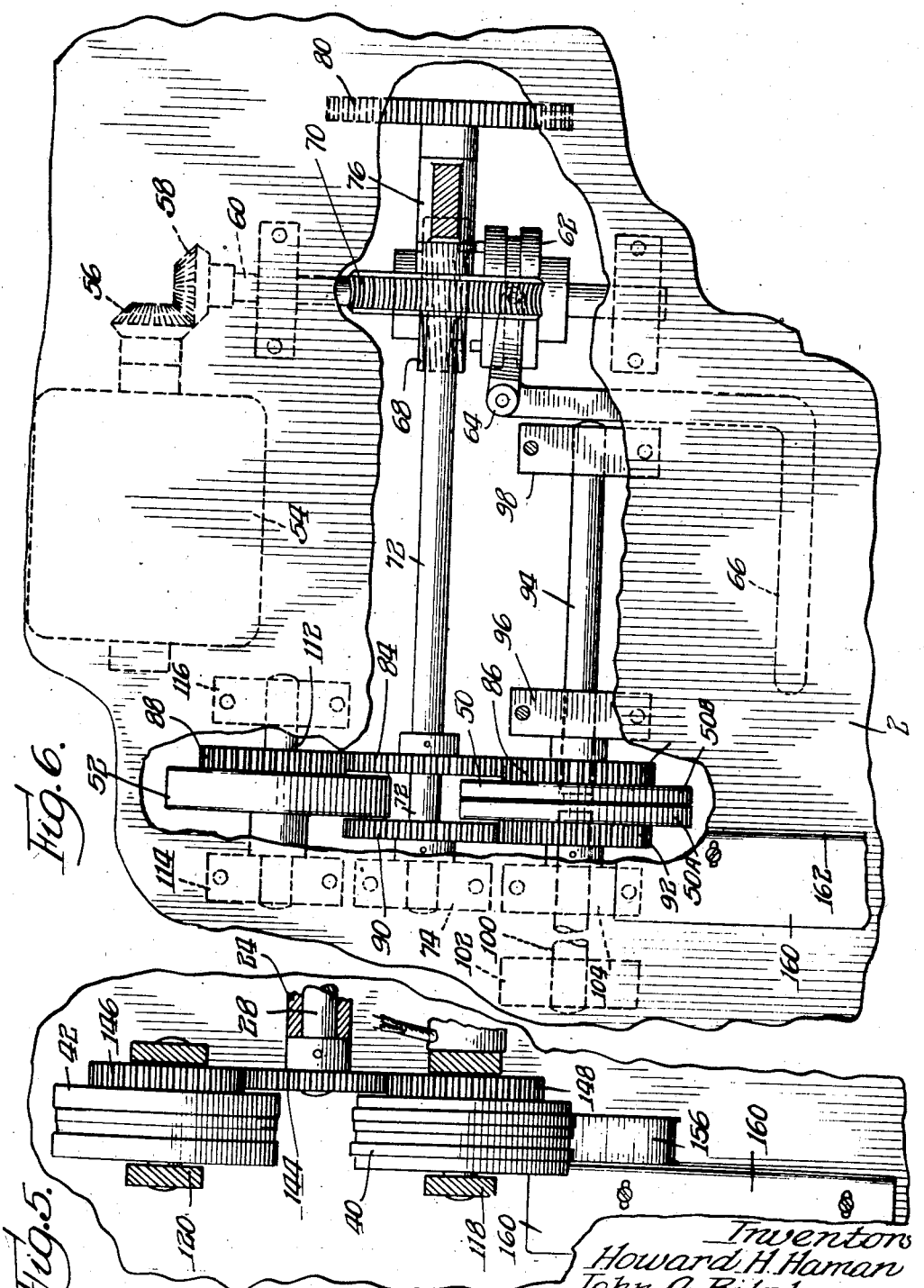

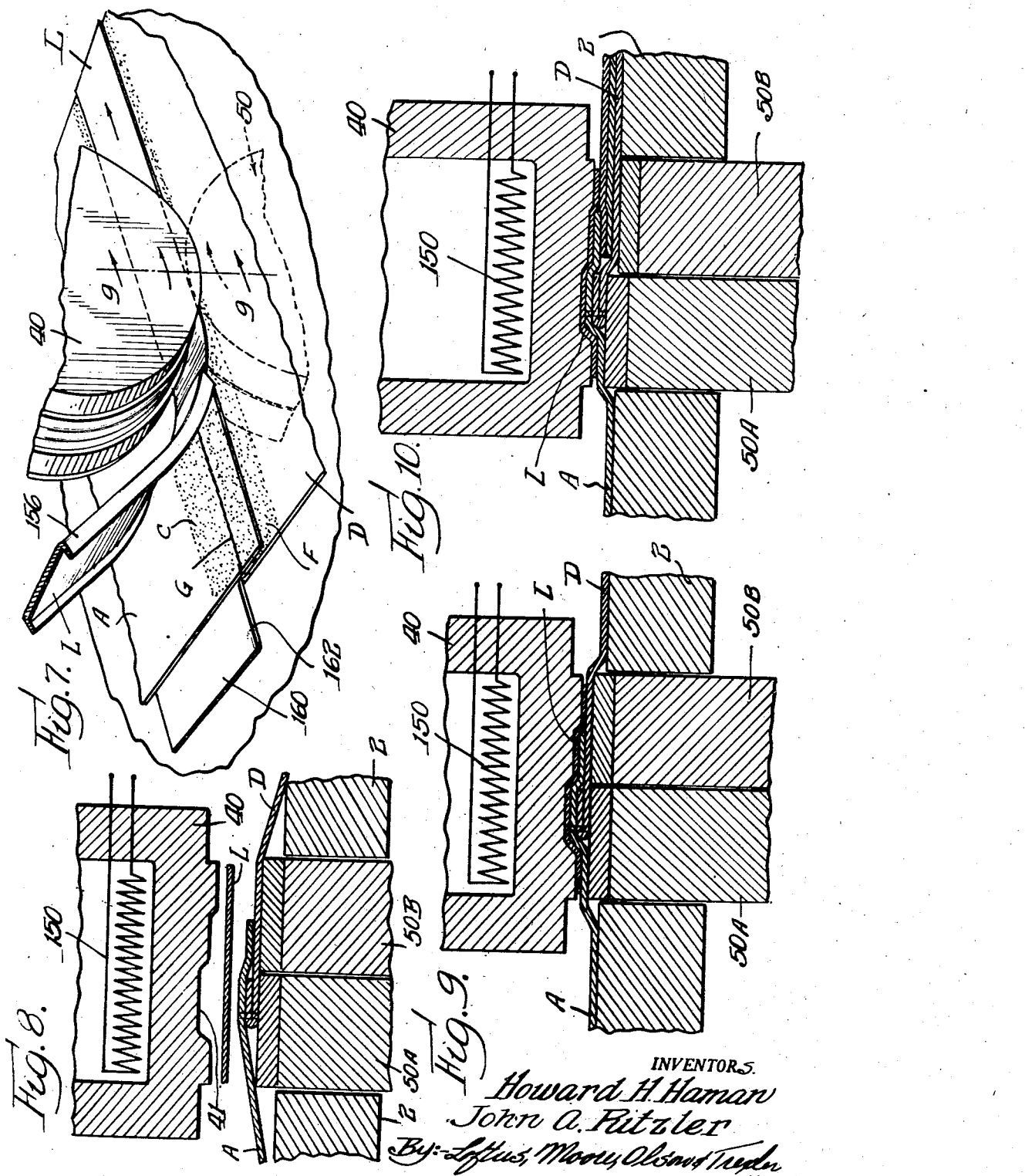

2,422,676

UNITED STATES PATENT OFFICE 2,422,676

MEANS FOR PRODUCING A WATERPROOF SEAM FOR POLYVINYL RESINOUS COATED FABRICS

Howard H. Haman and John A. Ritzler, Three Oaks, Mich., assignors to The Warren Featherbone Co., Three Oaks, Mich., a corporation of Michigan Application June 9, 1944, Serial No. 539,457

7 Claims. (Cl. 154—42)

This invention relates to a means for and method of forming a waterproof seam between two pieces of fabric coated with a polyvinyl resinous waterproofing material.

Among the objects of the present invention is to provide a means and method for forming a waterproofing seam between portions of two fabrics carrying a coating of polyvinyl resinous waterproofing material, and wherein the seam is covered with a fabric tape likewise carrying a coating of polyvinyl resinous waterproofing material, the resinous waterproofing material contacting the seam, and wherein the taped seam is caused to travel continuously and uninterruptedly along a predetermined path while subjected to a heating and pressing operation performed upon the seam without interrupting the travel of the seam, and in a manner to cause a flowing of the resinous material into the stitched perforations to seal the same and between the contacting faces of the fabric and the tape to form a cured, bonded, waterproofing seam between the two pieces of fabric.

Yet another object of the invention resides in providing a method and apparatus for forming a waterproofing seam between two fabrics each carrying a coating of polyvinyl resinous waterproofing material, which comprises seaming the two pieces of fabric together, applying a fabric tape carrying a coating of polyvinyl resinous waterproofing material, to the seam of the fabrics, causing the seamed fabric to travel along a predetermined path while effecting a heating and pressing operation upon the seam without interrupting the travel of the seam whereby to form a bonded, waterproofing union or seam between the fabrics.

Yet another object of the invention resides in providing heating and pressing means for forming a waterproofed fabric seam wherein the fabric seam is fed between the heating and pressing means, at least a portion of which is sectionally formed with respect to the cross sectional area of the seam so as to exert a uniform pressure upon the seam despite differences of thickness in the seam.

Yet another object of the invention resides in providing rotatable pressing rolls, at least one of which is heated, and between which the seamed fabric to be waterproofed is heated and pressed and by which it is continuously fed therebetween to effect the seam formation.

Yet another object of the invention resides in providing means for driving each part of the sectional heating and pressing rolls to effect the feeding of the seamed fabric therebetween while permitting the relative movement of these sections of the roll to correspond to variant thicknesses in the seam.

Yet another object of the invention resides in providing a method forming a seamed fabric.

Other and further objects of the invention will be apparent from a perusal of the following specification when taken in connection with the accompanying drawings wherein:

Figure 1 is a side view of the machine, with portions being shown in cross section;

Figure 2 is a fragmentary detail view taken on the line 2—2 of Figure 1;

Figure 3 is a vertical sectional view taken on the line 3—3 of Figure 1;

Figure 4 is a detail fragmentary view showing the scraper blade in relation to one of the pressing rollers;

Figure 5 is a detail plan sectional view taken on the line 5—5 of Figure 1;

Figure 6 is a detail plan sectional view taken on the line 6—6 of Figure 1;

Figure 7 is a fragmentary detail sectional view;

Figures 8, 9 and 10 are fragmentary detail sectional views showing the various positions of the rolls and the material as it is fed through the machine.

Figure 11:
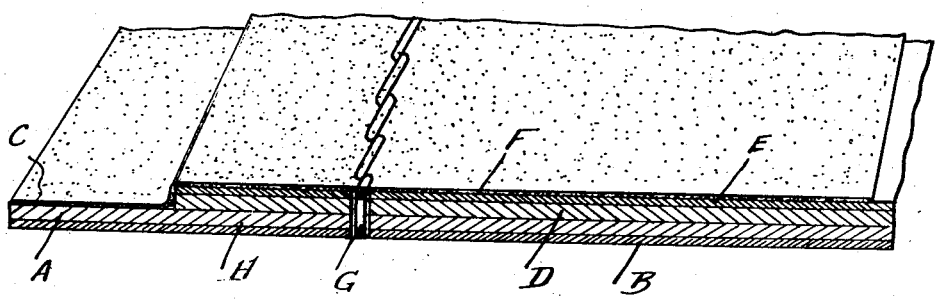
Figures 11, 12 and 13 are enlarged cross sectional views through the material, showing the progressive steps as it is being treated.
Figure 12:
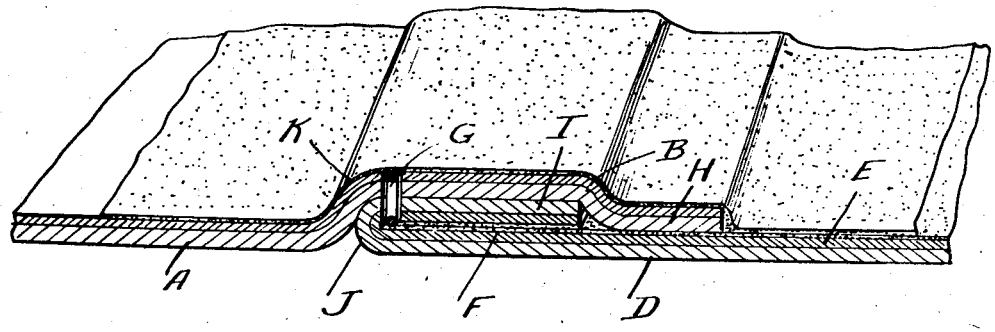
Figure 13:
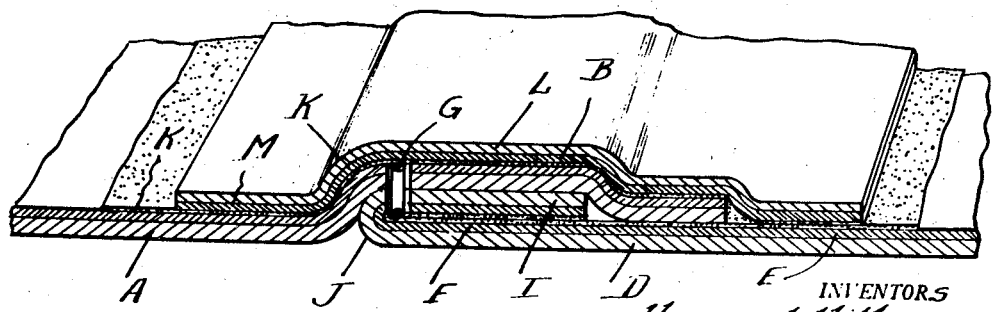

The mechanism of the present invention is utilized to provide a bonded, sealed, waterproof seam, and preferably a stitched seam, interconnecting two waterproofed fabric pieces which may be used for making a raincoat, a large tarpaulin, or any type of water-shedding or waterproof material that requires a seam. In the present illustration we have shown the fabric as two pieces of fabric which are impregnated with a waterproof coating of plasticized polyvinyl chloride or polyvinyl butyral. This is a synthetic polymeric waterproofing material. A preferred waterproofing material is plasticized polyvinyl chloride sold under the trade name of "Koroseal." This fabric is coated on one side with a waterproofing polyvinyl resinous material. The coating tends to partially soak through so that the side on which the coating is applied has a smooth, shiny, lustrous surface, whereas the other side has a dull, rough surface. The particular invention is concerned with providing a seam to unite together two of these pieces of waterproofed fabric, and as shown in Figure 11, the fabric piece A is shown as provided with the polyvinyl resinous coating B, and as will be hereinafter set forth, being provided with a marginal zone coating of polyvinyl resinous material C. This fabric is to be united to a second fabric piece D which likewise carries on one face the polyvinyl resinous waterproofing coating E. This fabric piece D is provided with a marginal coating F of polyvinyl resinous waterproofing material of substantially the same type as the coating E. These two fabric pieces A and D are laid together as shown in Figure 11, with their resinous coatings facing outwardly, and are then stitched together as at G, the stitching passing completely through the coated fabrics. The stitching is made preferably after the coating F is dried. Next the two fabric ends are separated and are placed in substantially a common plane, as shown in Figure 12. The connecting stitching G forms a pivot for the two layers so that the short end H of the fabric piece A will overlie the short end I of the fabric piece D, and the fabric piece D will overlie one end of the stitching G. The opposite end of the stitching G will appear at the surface of the upper side of the fabric piece A. The fabric piece D is provided with the fold J. It will be noted that in this last arrangement the polyvinyl resinous coating F will lie between the fold I and the fabric piece D below the stitches. This resinous material functions under subsequent heat and pressure to flow and seal the lower ends of the stitched perforations shown in Figure 12, and in addition serves to adhere the flap I to the body portion of the fabric D. This flowing of the polyvinyl material is due to the fact that the cement coating F is applied directly to the main coating E of the fabric D between the flap I and the fabric D where the stitching takes place, so that there is ample polyvinyl resinous material to seal the stitching perforations at this point. After the two fabrics A and D are arranged as shown in Figure 12, the upper sides of the fabric A and fabric D, as shown in Figure 12, are then given a coating K of polyvinyl resinous cement which is applied directly to the polyvinyl resinous coatings B and E of said fabric pieces A and D. Thus the entire marginal surfaces of the fabrics A and D at the seam and on each side of the seam, include not only the original coatings B and E, but also include a superimposed polyvinyl coating of cement. The seam is now ready for the application of the tape L, which tape is a fabric tape carrying a coating of polyvinyl resinous waterproofing material, preferably of the same material with which the fabrics A and D are coated. This fabric tape, in fact, is preferably of the same material as A and D, except that if desired it may be a lighter weight fabric. This tape L is applied over the seam, as shown in Figure 3, with the polyvinyl coating M on the tape face downward. Attention is called to the fact that this polyvinyl coating M contactingly overlies the coating K of the seam and adjacent coated parts of the fabric A and D, and the fabric tape directly overlies the upper edge of the stitching G. The fabric seam with the tape overlying, as shown in Figure 13, is now ready to be run through the heat and pressure devices constituting the device of the present invention, whereby the polyvinyl resinous material is caused to flow under heat and pressure to plug the stitching perforations through the fabric and to unite the tape and the fabrics to each other to provide a sealed, bonded, strong, waterproof seam, which during the heating and pressing operation will cure, and shortly thereafter will set permanently. The two fabrics thus seamed, and with the tape overlying as shown in Figure 13, are laid upon the table 2 and fed between the pressing rolls as hereinafter described. In general, these pressing rolls comprise upper and lower rolls suitably pressed together, preferably by spring mechanism, to produce the required pressure therebetween, and one of these rolls is heated to a suitable temperature while the other roll is maintained at room temperature in order to dissipate the heat and to speed up the curing operation. These rolls are metal rolls with polished surfaces, and they are made in sections with the peripheries relatively movable, whereby to exert a uniform cross sectional pressure upon the fabric and tape as the rolls feed the fabric therebetween in a continuous action, and at the same time heat and press the fabrics and tape together to effect the flowing of the polyvinyl material, its curing, and to permit its subsequent setting. In the present instance the seaming operation is carried out in a continuous manner and with considerable rapidity, preferably by driving the pressing rolls, thereby causing them not only to do the pressing and heating, but to feed the length of material therethrough.

Referring now to the drawings in detail, the device comprises an ordinary table 2 mounted on legs 4 and forming a support or foundation for the mechanism which is mounted on the table or other support. The mechanism comprises a frame member having two side legs 6 and 8 and a horizontally disposed top frame member 10. Supported from the horizontal top frame member 10 is a bracket arm 12 which rotatably supports a reel 14 upon which is coiled the tape L, the nature of which will be hereinafter described. A spring 18 surrounding the central shaft of the reel provides a sufficient friction to keep the tape taut, as is well known in the art.

The cross head 10 supports two depending arms 20 and 22 (see Fig. 3) the bottom portions of which provide bearings 24 and 26 for a horizontally disposed shaft 28. This cross head 10 also supports a supporting plate 30 which carries bearings 32 and 34 for vertical shafts 36 and 38. These shafts support the heating and pressing rolls 40 and 42 hereinafter referred to.

The top of the table is provided with a pair of openings 46 and 48 through which project the peripheries of a pair of roller platens 50 and 52, the peripheries of these rollers 50 and 52 extending through these openings and lying in opposition to the upper pair of rollers 40 and 42.

Means is provided for driving the rollers so that they not only heat and press the material therebetween but likewise feed it along at a constant rate so that the heating effect on the seam will be uniform. In addition these rollers are formed of sections whereby the pressing effect across the entire section of the seam will be uniform despite differences in thickness of the seam.

In accordance with the foregoing, beneath the table is mounted a motor 54, the shaft of which drives the bevel gear 56 which in turn drives another bevel gear 58 on a shaft 60. This shaft 60 in turn carries a clutch 62 adapted to be shifted, by a clutch shifter 64 having a clutch shifting handle 66, into clutching relation with a worm gear 68 loosely mounted upon the shaft 60. The worm gear in turn meshes with a worm wheel 70 pinned to a shaft 72 mounted in bearing blocks 74 and 76, see Figure 6. This shaft has pinned to it a gear 80 which meshes with another gear 82 on the upper drive shaft 28. In addition the shaft 72 has pinned thereto another gear 84 which meshes with oppositely disposed gears 86 and 88, said gear 86 being fastened to the side 50B of the lower roller. Likewise the gear 88 is fastened to the single roller 52. The shaft 72 continues through gear 84 and is provided with a gear 90 similar to gear 84, which meshes with the gear 92 fastened to roller section 50A. Wheel section 50B and its gear 86 are mounted on a cross shaft 94 carried by bearings 96 and 98, and wheel section 50A and its gear 92 are mounted on a shaft 100 carried in bearings 102 and 104. Each of these bearings consists of a slidable block 106 which is spring pressed upwardly by means of a spring 108 to cause the shafts 100 and 94 to be moved upwardly, and causing the rollers 50A and 50B to be pressed up against the lower periphery of the upper roll 40. In order to adjust the amount of pressure that is on these blocks the screw adjustments 110 are provided.

The lower roller 52 with its gear 88 is mounted upon a shaft 112 which is also mounted in spring pressed bearing blocks 106 which are likewise adjustably positioned in bearings 114 and 116 to cause the roller 52 to press upwardly against the periphery of the upper roller 42.

Means is provided for raising the front and rear upper rollers so as to feed the fabrics and their seam between the upper and lower rollers. To this end the upper rollers 40 and 42 are each carried by the yokes 118 and 120 in turn mounted on shafts 36 and 38 which are normally spring pressed downwardly by springs 125 and 127. The upper ends of these shafts 36 and 38 have pinned thereto as at 122 and 124 cams 126 and 128, each of which has a handle 130 whereby upon lowering the handles the cams wipe against the bosses 32 and 34 whereby to raise the shafts and hence the rollers 40 and 42.

In addition, the shaft 28 terminates in a gear 144 pinned thereto, which in turn meshes with two gears 146 and 148 integrally carried by each of the upper rolls 40 and 42 respectively, whereby said rolls are positively rotated by the rotatable gear 144 on the shaft 28.

Means is provided for heating the roller 40 and this comprises an electric heater coil 150 located internally of the roller 40 and connected to a proper electrical circuit for heating the roller at desired times and as it rotates. In addition the upper roller is provided with a scraper 152 mounted upon a bar 154 which moves with the raising and lowering of the yoke 118. This bar also carries on its opposite end a tape guide 156.

As shown in Figure 4, the scraper is suitably conformed at its bottom to ride in the various annular grooves or shoulder portions of the upper roll. As shown in Figure 8, this upper roller is grooved in cross section to conform to the different thicknesses of the seam in order to get an even pressure upon each cross sectional area of the seam, and as shown in Figures 9 and 10, this roller when in pressing and heating engagement with the fabrics and tape, presents hard metallic surfaces between which the tape and fabric pieces of the seam are pressed. By reference to Figures 9 and 10 it will be seen that the two sections of the roller may yield one with respect to the other, to accommodate the varying thicknesses of the seam, such for instance as where a cross seam forms a part of the seam. This would take place, for instance, at the shoulder seam of a raincoat. This relative movement of the roller sections 50A and 50B is due to the spring pressed bearing blocks 106, as shown in Figure 3.

Means is provided for accurately guiding the seam with respect to the cross section of the roll so that the thicknesses accurately adjust themselves and correspond to the cross sectional area of the rolls. This is accomplished by providing the upper part of the table bed with a laterally adjustable guide plate 160. This guiding plate has an upturned guide edge 162 which contacts the folded end J of the seam, see Figure 13, and thus lines up this part of the seam with the most deeply recessed portion 41 of the heating and pressing roll, see Figure 8.

It is understood that the upper and lower presser rolls 42, 50 and 52 are not heated. The top roll 42 has an annular cross sectional recess similar to that of the top roll 40 whereas the bottom roll 52 has a plain periphery, as shown in Figure 6. These rolls, as heretofore stated, are driven together to not only assist in feeding the seamed fabric and tape therebetween, but also to exert an additional pressing action upon the seam as it is fed through the rollers. The rear rollers 42 and 52 smooth and even out the seam and apply any additional pressure to cause the sealing effect to be completed, without at the same time heating the fabric seam and tape. As the seam leaves the rear set of rollers 42 and 52 the material has cooled sufficiently so that the seam is set. The setting of the polyvinyl resinous material is encouraged and speeded up by the contact of the seam with the unheated rollers 42, 50, and 52.

The springs 36 and 38 which urge the upper rolls downwardly are arranged to provide a pressure of substantially thirty pounds, more or less, per square inch upon the seamed fabric as it is passed between the roller and the heating means for the upper roll is arranged to produce a temperature of substantially 180° F., more or less. The spring tension can be more or less than thirty pounds per square inch, according to the requirements of the material to be processed.

In the operation of the device, when the motor is put into operation and the seam, as shown in Figure 13, is fed between the rolls, the rolls will be operated at a speed of substantially four revolutions per minute, thereby to feed the seamed fabric therebetween and therethrough at a constant uniform rate. The heated roll 40 will press the seam against the lower roll 50 over a very narrow area of contact of about one-eighth of an inch, extending entirely across the seam. The heating effect is at such temperature as to effect the curing of the polyvinyl resinous material in the short space of time that the heated roll is in contact with the fabric and is pressing against the lower roll. The scraper 152 serves to scrape off any resin which may tend to adhere to the roll, and the lower roll 50 which is at room temperature tends to dissipate the heat quickly so as to condition the seam for rapid setting as it passes from between the rolls 40 and 50. Without this relatively cooler surface of the lower roll 50 the material at the seam would take longer to cure. It is to be noted that the upper and lower rolls are positively driven at substantially the same speed, whereby to prevent any slip therebetween which would tend to ruin the seal and the tape and create an objectionable section.

The fabric and the fabric tape may be coated with any type of waterproofing material disclosed in an application filed by Howard H. Haman and Charles E. Whalen contemporaneously herewith entitled "Method of sealing together two pieces of waterproof fabric, and the seam formed thereby," Serial No. 539,456, filed June 9, 1944, now Patent No. 2,406,830, dated September 3, 1946. Wherever the expression "polyvinyl resinous material" is used it is meant to include all substances disclosed in said application.

Obviously the invention is not limited to the specific details of construction disclosed herein but is capable of other modifications and changes without departing from the spirit and scope of the appended claims.

Having thus described our invention, what is claimed as new and desired to be secured by Letters Patent is:

1. An apparatus for forming a waterproof seam for interconnecting two fabrics coated with polyvinyl resinous waterproofing material and having a row of stitching passing through marginal portions of said coated fabrics, and wherein a fabric tape coated with polyvinyl resinous material overlies the stitched seam with the coating of the tape contacting the stitched seam, comprising in combination a support, means on said support for uninterruptedly feeding the seamed and taped fabric along a predetermined path relative to said support, and means mounted on said support in the path of movement of the travelling seam of said fabrics for heating and pressing the seam sufficiently to cause the flow of a portion of the polyvinyl resinous material at least partially into the perforations of the stitching to seal the same and to cure that portion of the polyvinyl resinous material between the contacting fabrics and the tape whereby upon removal of said heat and pressure said seam subsequently sets and provides a bonded waterproofing junction between the two fabrics, said heating and pressing means comprising opposed, hard faced, arcuate surfaces moving at the same rate of travel as the travel of the seam, one of said arcuate pressing means being formed of relatively yieldable sections, whereby to provide uniform pressure throughout the cross sectional area of the pressing means irrespective of the variations in thickness of the seam.

2. An apparatus for forming a waterproof seam for interconnecting two fabrics coated with polyvinyl resinous waterproofing material, said seam including overlapping marginal portions of said coated fabrics of variant thicknesses, and wherein a fabric tape coated with polyvinyl resinous materia overlies a portion of the seam and with the coating of the tape contacting one of the fabrics, comprising in combination a support, means on said support for uninterruptedly feeding the seamed and taped fabric along a predetermined path relative to said support, and means mounted on said support in the path of movement of the travelling seam of said fabrics for heating and pressing the seam sufficiently to cause the flow of a portion of the polyvinyl resinous material to seal and to cure that portion of the polyvinyl resinous material between the contacting fabrics and the tape whereby upon removal of said heat and pressure said seam subsequently sets and provides a bonded waterproofing junction between the two fabrics, said heating and pressing means comprising opposed hard faced arcuate surfaces moving at the same rate of travel as the travel of the seam, one of said arcuate pressing means being formed of relatively yieldable sections, whereby to provide a uniform pressure throughout the cross sectional area of the pressing means irrespective of the variations in thickness of the seam, and one of said hard faced arcuate surfaces being heated.

3. An apparatus for forming a waterproof seam for interconnecting two fabrics coated with polyvinyl resinous waterproofing material and having a row of stitching passing through marginal portions of said coated fabrics, and wherein a fabric tape coated with polyvinyl resinous material overlies the stitched seam with the coating of the tape contacting the stitched seam, comprising in combination a support, means on said support for uninterruptedly feeding the seamed and taped fabric along a predetermined path relative to said support, and means mounted on said support in the path of movement of the travelling seam of said fabrics for heating and pressing the seam sufficiently to cause the flow of a portion of the polyvinyl resinous material at least partially into the perforations of the stitching to seal the same and to cure that portion of the polyvinyl resinous material between the contacting fabrics and the tape whereby upon removal of said heat and pressure said seam subsequently sets and provides a bonded waterproofing junction between the two fabrics, said heating and pressing means comprising opposed metal rollers, means for resiliently pressing said rollers toward each other, one of said rollers being heated, and one of said rollers being composed of relatively yieldable sections.

4. An apparatus for forming a waterproof seam for interconnecting two fabrics coated with polyvinyl resinous waterproofing material and having a row of stitching passing through marginal portions of said coated fabrics, and wherein a fabric tape coated with polyvinyl resinous material overlies the stitched seam with the coating of the tape contacting the stitched seam, comprising in combination a support, means on said support for uninterruptedly feeding the seamed and taped fabric along a predetermined path relative to said support, and means mounted on said support in the path of movement of the travelling seam of said fabrics for heating and pressing the seam sufficiently to cause the flow of a portion of the polyvinyl resinous material at least partially into the perforations of the stitching to seal the same and to cure that portion of the polyvinyl resinous material between the contacting fabrics and the tape whereby upon removal of said heat and pressure said seam subsequently sets and provides a bonded waterproofing junction between the two fabrics, said heating and pressing means comprising two pairs of opposed rollers, means for rotating each roller of a pair at the same uniform speed whereby the fabric seam fed between said rollers will be caused to travel uninterruptedly at a uniform rate therethrough, one of said rollers being heated, and one of said rollers being formed of relatively yieldable sections to provide uniform pressure along the width of the seam, irrespective of variant thicknesses transversely of the seam.

5. An apparatus for forming a waterproof seam for interconnecting two fabrics coated with polyvinyl resinous waterproofing material and having a row of stitching passing through marginal portions of said coated fabrics, and wherein a fabric tape coated with polyvinyl resinous material overlies the stitched seam with the coating of the tape contacting the stitched seam, comprising in combination a suppport, means on said support for uninterruptedly feeding the seamed and taped fabric along a predetermined path relative to said support, and means mounted on said support in the path of movement of the travelling seam of said fabrics for heating and pressing the seam sufficiently to cause the flow of a portion of the polyvinyl resinous material at least partially into the perforations of the stitching to seal the same and to cure that portion of the polyvinyl resinous material between the contacting fabrics and the tape whereby upon removal of said heat and pressure said seam subsequently sets and provides a bonded waterproofing junction between the two fabrics, said heating and pressing means comprising two pairs of rolls mounted on said support and between which the seam of the fabric is introduced whereby the rolls between which the fabric is first fed will contact and thereafter feed the fabric sequentially through the second set of rolls and whereinafter both sets of rolls serve to feed the fabric at a uniform rate of travel along a predetermined path, one of the rolls of that pair which the fabric first contacts during the feeding process being heated, and the opposed roll being formed of sections extending transversely of the width of the seam, said sections being relatively yieldable with respect to each other and with respect to the first mentioned roll, and spring means for pressing all of said rolls toward each other.

6. In a device of the class described, in combination with a support having a relatively flat top, two pairs of rolls mounted on said table with the peripheries between said pairs of rolls lying substantially in the plane of the table top whereby two fabrics, each coated with polyvinyl resinous material and stitched together along marginal portions thereof, are fed between a first pair of said rollers, a reel mounted on said support carrying a roll of fabric tape having a facing of polyvinyl resinous waterproofing material, means for feeding the tape from said reel into position to overlie the stitched seam of the two fabrics with the taped coating contacting the seam whereby said tape is adapted to contactingly overlie and cover said seam and passes with said seam between said first mentioned rollers, there being means for uniformly driving all of said rollers at a constant, identical rate of speed whereby the taped seam is fed uninterruptedly between said first and then said second set of rollers whereby to cause the taped seam to travel through all of said rollers at a uniform rate of speed, spring means for forcing said rollers together to exert a pressure upon said seam as it passes through said rollers, and means for heating only one of said first mentioned set of rollers, the lower one of said first pair of rollers including relatively yieldable sections.

7. In a device of the class described, in combination with a support providing a relatively flat feeding surface, there being openings in said surface, upper and lower pairs of metallic rolls mounted in opposition above and below said openings whereby the peripheries of said rolls lie substantially in the plane of said flat surface, means for resiliently mounting one of said pair of rolls so as to constantly press toward the peripheries of said other rolls of a pair, means for rotating each of said rolls at the same uniform rate of rotation whereby material fed between said rolls will be engaged and fed thereby through said rolls at an uninterrupted, uniform rate of travel, means for releasing said resiliently mounted rolls whereby to admit material therebetween to be fed, means for heating one of the rolls of each pair of rolls, the rolls of each pair that are opposite the heated rolls being formed of relatively yieldable sections extending transversely of the width of the roll.

HOWARD H. HAMAN.
JOHN A. RITZLER.

REFERENCES CITED

The following references are of record in the file of this patent:

UNITED STATES PATENTS

| Number | Name | Date |
|---|---|---|
| Re. 20,789 | Bergstein | July 12, 1938 |
| 2,323,629 | Spanel | July 6, 1943 |
| 2,343,117 | Vincent | Feb. 29, 1944 |
| 2,343,975 | Hosfield | Mar. 14, 1944 |

FOREIGN PATENTS

| Number | Country | Date |
|---|---|---|
| 436,774 | Great Britain | Oct. 17, 1935 |

OTHER REFERENCES

A. P. C. application of Custers Serial No. 391,802, published April 27, 1943.